3,798,178
SELF-REGENERATIVE DEHYDROGENATION CATALYST

Frederick J. Soderquist, Essexville, and Lyle E. Martz, Midland, Mich., assignors to The Dow Chemical Company, Midland, Mich.
No Drawing. Continuation-in-part of application Ser. No. 886,353, Dec. 18, 1969. This application Feb. 17, 1972, Ser. No. 227,267
Int. Cl. B01j 11/08, 11/22
U.S. Cl. 252—468                    9 Claims

ABSTRACT OF THE DISCLOSURE

Metal oxide dehydrogenation catalysts having an electrically conducting, discontinuous amount of certain specific metals incorporated either through the bulk of the catalyst or distributed on its surfaces provide comparatively high electrical conductivity, and can be more uniformly heated by use of an electrical current than similar catalysts having no free metal present. The metal-containing or metal-coated catalysts can comprise the entire mass of catalyst in a reactor, or such catalyst can be placed adjacent to the electrodes and in intimate contact with catalyst containing no metal to promote more uniform passage of electrical current through a catalyst bed. The novel method comprises the use of the catalyst having metal particles discontinuously distributed throughout its bulk as the sole catalyst, or as part of the catalyst bed in contact with electrodes, admixed with catalysts containing no metal, to dehydrogenate hydrocarbons, while passing an electrical current through the catalyst bed to maintain desired temperature levels.

CROSS-REFERENCE TO RELATED APPLICATION

The present application is a continuation-in-part of our previous application Ser. No. 886,353 filed Dec. 18, 1969 now abandoned.

BACKGROUND OF THE INVENTION

The catalytic dehydrogenation of hydrocarbons to form useful, more highly unsaturated derivatives, such as the dehydrogenation of ethyl benzene to styrene, cumene to α-methyl styrene, diethyl benzene to divinyl benzene, ethyl toluenes to p, or m-methyl styrene, n-butene to butadiene, isoamylenes to isoprene, and cyclohexane to cyclohexene is practiced on a large commercial scale. The dehydrogenation reaction is highly endothermic, so that a diluent and heat-supplying agent, usually high temperature steam, is admixed with a vaporized hydrocarbon and passed over a heterogeneous, self-regenerative catalyst. One of the major difficulties is to maintain a uniform, desirably high temperature throughout the catalyst bed. There have been numerous approaches to the solution of this problem. Among these are complex reactor structures in which a heating medium such as molten salts, superheated steam or combustion gases are circulated externally of the reaction chambers. Other attempts at solution provide a series of reactors with direct or indirect interstage heating means. U.S. Pat. 3,288,871 discloses a means of improving the temperature distribution profile in a regenerative dehydrogenation catalyst bed by passing an electrical current through the bed. This patent teaches that metal oxide, self-regenerative catalysts usful for converting ethyl benzene to styrene all have a relatively high electrical resistivity when fresh and that after steady state is attained, under actual operating temperature and feed conditions, the resistivity decreases to a comparatively low range. This range is influenced partly by the catalyst composition, partly by reaction temperature, partly by the feed ratio of steam to the hydrocarbon undergoing dehydrogenation, and partly by the feed rate or cracking severity. The degree of control of the resistivity of the catalyst is relatively small.

Means for increasing the resistivity somewhat by the addition of magnesium oxide to a catalyst containing a major portion of chromium oxide or certain mixtures thereof, with iron oxide, or zinc oxide is described in U.S. Pat. 3,435,086.

One difficulty with supplemental electrical resistance catalyst-heating systems, particularly where the preferred direct current is used as the energy source, is that flexibility of the electrical source is quite limited, except at very high expense, e.g., the voltage and amperage changes needed to maintain the desired reaction temperature cannot be attained readily with a fixed power source. Since D.C. voltage fairly constant at any given speed of a generator, the usual means for controlling the amount of energy is through change in amperage or load on the generator. This latter means of trying to control the reaction temperature is impractical or almost impossible with a catalyst having a comparatively high normal resistivity.

A second problem presents itself as reactor size increases. The larger the distance between electrodes the greater the voltage requirement needed to effect a flow of current from one electrode to the other. This could result in use of such high voltages as to make the supplemental heating process uneconomical and/or unsafe for commercial use. It is well known, for example, that arcing is difficult to stop at high voltages.

STATEMENT OF THE INVENTION

It has been found that the resistivity of a metal oxide, self-regenerative, unsupported dehydrogenation catalyst can be adjusted by incorporating conducting metal particles, throughout the body of the catalyst or by coating the catalyst surface with a porous, discontinuous layer of such metal. The controlled resistivity permits the use of such catalyst for dehydrogenation of a wide variety of hydrocarbons under a wide range of temperature, feed stock composition and cracking severity conditions, in a single reactor having a fixed power source. In addition, the catalysts of this invention can be used in a variety of reactor designs, in that the conductivity can be controlled either by the metal particles used, the amount of metal in the catalyst and the physical distribution of the metal-containing catalyst when admixed with the self-regenerative metal oxide catalyst containing no metal.

The self-regenerative, unsupported metal oxide catalysts which are made less resistive to the passage of an electrical current by the addition of finely divided metal or coating of the catalyst with a discontinuous layer of the metal, are catalysts having a material proportion of iron oxide, zinc oxide, magnesium oxide, chromium oxide or a mixture of these oxides. Chromium oxide can serve as a major catalyst ingredient or in small amounts, it can serve as a promoter. Other promoters such as alkali metal hydroxides, nitrates, acetates, sulfates or carbonates, which are convertible, at least in part, to the corresponding alkali metal oxide if the catalyst is calcined can also be added to the catalyst. However, pre-calcining is not essential, because the catalyst gets sufficient heat treatment under actual use conditions.

Representative alkali metal compounds are those containing lithium, sodium, potassium, cesium and rubidium moieties. The preferred alkali metal compounds for use in making the catalysts are the potassium salts or oxides and most preferred are potassium carbonate or oxide. These alkali metal compounds are essential ingredients of the self-regenerative catalysts because they catalyze the carbon-steam reaction to keep the catalyst relatively free of carbon deposits.

Representative metals which are useful for improving the conducivity of the unsupported catalysts include iron, copper, chromium, gold, vanadium, silver, platinum, palladium, rhenium and alloys of the noble metals. Alloys of other metals can be used, if they do not fuse or melt at the reaction temperatures employed. Catalyst poisons such as silica, nickel or cobalt should be avoided.

The finely divided metal can constitute 1 to about 50 weight percent of the finished catalyst and preferably from about 5 to 30 percent. With sprayed metal the content preferably ranges from 1 to about 10 percent by weight.

If the catalyst is to contain the finely divided metal incorporated in the body of the catalyst the metal should be added to either a paste or slurry of the catalyst ingredients or to a dry blend of the ingredients prior to the formation of pellets, pills or other geometric shapes. For preparing catalyst with discontinuous layers or coatings of finely divided metal on the surface, the geometric form of the catalyst, such as pellets or pills, is first prepared and then coated with the finely divided metal powder by known means such as rolling in the powder, or by spraying molten metal on the surface of the agitated catalyst.

The preferred catalyst is one which has the finely divided metal distributed throughout its bulk, and most preferred is such catalyst in which the metal is chromium.

The preferred catalysts are unsupported. A typical procedure for making a catalyst containing 10% chromium metal is to dry blend 79.1 weight percent $Fe_2O_3$, 4.5% $Cr_2O_3$, 6.3% $K_2CO_3$, 10.0% chromium metal powder (99+% pure) preferably 200 mesh or finer for easy distribution throughout the finished catalyst, and 0.1% tannic acid is set out below. The mixture was mulled for about 20–30 minutes. Water was added slowly to a content of about 16% based on the dry ingredients. Wet mixing continued for about 15–25 minutes. The mixture was formed into 3.3 x 4.5 mm. pellets and dried at room temperature for up to about 24 hours and then oven dried at 175° C. for about 24 hours. The catalyst was screened on a fine mesh sieve and the small amount of fines was discarded. One catalyst prepared as described had a bulk density of 1.748 g./ml. and an average crushing strength of 10–14 lbs. per pellet.

Tabulated below are the compositions of other unsupported finished catalysts, made by the procedure described above, and including catalysts containing iron or copper powders. The percentages are on a weight basis.

TABLE I.—CATALYST COMPOSITIONS

| Catalyst number | Percent | | | | Metal | | |
|---|---|---|---|---|---|---|---|
| | $Fe_2O_3$ | $Cr_2O_3$ | $K_2CO_3$ | Tannic acid | Fe | Cu | Cr |
| 1 | 79.91 | 4.55 | 6.36 | .09 | 9.09 | | |
| 2 | 73.25 | 4.17 | 5.83 | .08 | 16.67 | | |
| 3 | 43.95 | 2.50 | 3.50 | .05 | 50.00 | | |
| 4 | 79.91 | 4.55 | 6.36 | .09 | | 9.09 | |
| 5 | 64.63 | 3.68 | 5.15 | .07 | | 26.47 | |
| 6 | 79.91 | 4.55 | 6.36 | .09 | | | 9.09 |
| 7 | 63.93 | 3.64 | 5.09 | .07 | | | 7.27 |

The catalyst containing no metal powder had a resistivity of 17.78 to 21.49 ohm cm. under reaction conditions. The catalyst with 9.09% Fe had a resistivity of 2.0–2.2 ohm cm., that containing 16.67% Fe was .21 ohm cm. and that with 50% Fe was .14 ohm cm.

The metal-containing catalysts of the invention can be used in (1) linear process flow-linear electrical flow, (2) linear process flow-radial electrical flow or (3) radial process-radial electrical flow reactors. In the latter two cases the resistance of the catalyst is calculated from the formula $$R = \frac{P}{2\pi L} \ln \frac{OD}{ID}$$

where P is the resistivity of the catalyst. L is the length of the bed and ln $OD/ID$ is the natural logarithm of the outer and inner electrode diameter.

TEST OF CATALYST

Unsupported Catalyst No. 6, as described in Table 1, was used in this run. One reactor comprised a Type 430 stainless steel alloy shell having an outlet in the bottom and a flanged open neck at the top. The shell was insulated to prevent heat loss. The reactor consisted of a Type 430 foraminous, cylindrical catalyst holding chamber, having a central hollow electrode, which was perforated at the juncture with the cylindrical chamber. This electrode was concentric with the shell neck. The base of the catalyst chamber was a ceramic nonconductor. Between the inner wall of the shell and the catalyst chamber was a space through which vapors which passed through the catalyst bed could then pass through the outlet at the base of the shell. The wall of the shell served as the second or ground electrode. Thus, any electrical current which was fed to the hollow electrode would pass through the catalyst, to the wall of the shell and back to the power source to complete the circuit.

In operation both the electrical current and process vapors flowed in a radial manner from the central electrode to the outer shell and both flows were parallel. Catalyst was loaded to a height well above the perforated section of the electrode to prevent process vapors from by-passing the catalyst bed.

A second reactor used in these tests was designed to provide an axial process flow of vapors and radial flow of electrical current. This reactor design differed from that described above primarily in that it contained a metal screen on the bottom of the reactor chamber through which vapors could pass without necessarily making a radial path through the fixed reactor bed.

The reactor structures and their mode of operation are described in detail in copending patent application Ser. No. 886,116 filed on Dec. 18, 1969 in the names of F. J. Soderquist, H. Kehde and L. E. Martz and entitled "Electrical Heated Reactors," now Pat. 3,652,699.

A mixture of ethyl benzene and steam in various proportions pre-heated to about 600° C., and fed into the catalyst bed through an inlet at the neck of the reactor shell. The vapors passed through the catalyst (about ½ cu. ft. in volume) and out of the base of the reactor shell and then were subjected to well known recovery-train procedures, of cooling and separation of styrene from unreacted ethyl benzene. The temperature at the outlet of the apparatus was controlled by passage of an electric current through the central electrode and the catalyst bed to the shell wall. The data below were obtained during passage of a D.C. current through the catalyst. Tabulated below are results taken while using the radial process-radial current flow reactor.

TABLE II

| Temp., ° C. | | Feed rate, lbs./hr. | | Percent | | Resistivity ohm inches | Watts |
|---|---|---|---|---|---|---|---|
| Reactor inlet | Reactor outlet | E.B.[1] | $H_2O$ | Conv. styr. | Yield styr. | | |
| 607 | 511 | 27.3 | 30.0 | 24.14 | 88.76 | 10.3 | Resistance .163. |
| 608 | 514 | 29.4 | 30.0 | 23.64 | 89.42 | 10.1 | Resistance .116. |
| 607 | 542 | 27.3 | 30.0 | 30.58 | 88.30 | 2.2 | 880. |
| 609 | 543 | 31.5 | 30.0 | 30.92 | 89.06 | 2.1 | 908. |
| 610 | 546 | 29.4 | 30.0 | 30.92 | 89.92 | 2.0 | 935. |
| 609 | 546 | 29.4 | 30.0 | 31.50 | 91.44 | 2.2 | 896. |

[1] Ethyl benzene.

NOTE.—To convert ohm inches to ohm centimeters, multiply by 2.54.

The voltage fed to the reactor ranged from 3.9 to 6.4 and amperes ranged from 54 to 170. The data show that the amount of electrical power required for maintaining reaction temperature conditions is quite low for the volume of catalyst used. The reaction was run for 222 hours before shutdown, with no appreciable increase in resistance.

For comparative purposes, the metal-containing catalyst was replaced with one composed of 88.0% $F_2O_3$, 5.0% $Cr_2O_3$ and 7.0% $K_2CO_3$. Representative data taken during these tests are tabulated below.

TABLE III

| Temp., ° C. | | Feed rate, lbs./hr. | | Percent | | Resistivity ohm inches | Watts |
|---|---|---|---|---|---|---|---|
| Reactor inlet | Reactor outlet | E.B.[1] | $H_2O$ | Conv. styr. | Yield styr. | | |
| 595 | 527 | 27.3 | 30.0 | 19.83 | 93.73 | 16.6 | Resistance [.263. |
| 598 | 559 | 29.4 | 30.0 | 27.96 | 92.79 | 5.1 | 979. |
| 598 | 558 | 29.4 | 30.0 | 28.45 | 93.16 | 5.1 | 1,008; |
| 598 | 558 | 29.4 | 30.0 | 29.26 | 93.22 | 5.1 | 979. |
| 599 | 558 | 31.5 | 30.0 | 28.66 | 93.51 | 5.7 | 900. |

[1] Ethyl benzene.

This comparative run was continued for 204 hours. The resistivity of the catalyst was appreciably higher than the metal-containing catalyst of this invention, and the conversion of the ethyl benzene was slightly lower. It is apparent that the metal in the catalyst of this invention did not have any appreciable effect on the dehydrogenation activity.

When the other metal-containing self-regenerative, dehydrogenation catalysts described above are substituted for that shown in the specific example equivalent results are obtained.

This invention, thus, provides a means for modifying self-regenerative, dehydrogenation catalysts for adaption to any reactor having supplemental electrical heating. It is not now necessary to design such a reactor to meet the characteristics of the catalyst.

We claim:

1. A self-regenerative metal oxide dehydrogenation catalyst useful for dehydrogenating hydrocarbons in the presence of steam comprising (1) unsupported oxides of chromium, iron, magnesium or zinc and mixtures of said oxides containing, discontinuously, (2) from about 1 to about 50% by weight, based on the weight of the catalyst, of at least one metal of iron, copper, chromium, gold, vanadium, silver, platinum, palladium, rhenium and alloys of the noble metals, and (3) an alkali metal oxide, hydroxide, nitrate, sulfate or carbonate in an amount sufficient to catalyze the carbon-steam reaction to keep the catalyst relatively free of carbon deposits.

2. The catalyst of claim 1 in which the metal is copper.

3. The catalyst of claim 1 in which the metal is chromium.

4. The catalyst of claim 1 in which the metal is iron.

5. The catalyst of claim 1 in which the metal forms a porous, discontinuous surface distributed on the catalyst.

6. The catalyst of claim 1 in which the metal is present as discontinuous particles in the body of the catalyst.

7. The catalyst of claim 2 in which the copper content ranges from about 5 to about 30 weight percent in the form of particles distributed in the bulk of the said catalyst and the alkali metal compound is potassium carbonate.

8. The catalyst of claim 3 in which the chromium content ranges from about 5 to about 30 weight percent, in the form of a powder having a particle size no greater than about 200 mesh and the alkali metal compound is potassium carbonate.

9. The catalyst of claim 4 in which the iron content ranges from about 5 to 30 weight percent in the form of particles distributed in the bulk of said catalyst and the alkali metal compound is potassium carbonate.

References Cited

UNITED STATES PATENTS

| 2,341,995 | 2/1944 | Kipper | 252—474 X |
| 2,360,689 | 10/1944 | Kipper | 252—474 X |
| 2,385,484 | 9/1945 | Wright | 252—474 X |
| 2,426,829 | 9/1947 | Kearby | 252—474 X |
| 3,387,053 | 6/1968 | Lee | 260—669 R |
| 3,435,086 | 3/1969 | Soderquist et al. | 260—669 |
| 3,505,422 | 4/1970 | Brewer et al. | 260—669 R |
| 2,275,181 | 3/1942 | Ipatieff et al. | 252—474 X |
| 2,548,486 | 4/1951 | Lynch | 252—473 X |
| 3,390,102 | 6/1968 | Reitmeier | 252—475 |

DANIEL E. WYMAN, Primary Examiner

W. J. SHINE, Assistant Examiner

U.S. Cl. X.R.

252—467, 470, 472, 473, 474, 475, 440

1050
/69)

UNITED STATES PATENT OFFICE
CERTIFICATE OF CORRECTION

Patent No. 3,798,178          Dated March 19, 1974

Inventor(s) Frederick J. Soderquist and Lyle E. Martz

It is certified that error appears in the above-identified patent and that said Letters Patent are hereby corrected as shown below:

Column 1, line 64, delete "usful" and insert --useful--.

Column 2, line 15, insert --is-- after the word "voltage".

Column 3, line 2, delete "conducivity" and insert --conductivity--.

Column 3, Table I, under "Metal", the third heading "Cr", delete the last number "7.27" and insert --27.27--.

Column 4, Table II, under "Temp., °C" the first heading on "Recator" should read --Reactor--.

Column 4, Table II, under the eighth heading on "Watts", in the second line delete ".116" and insert --.161--.

Column 5, Table III, under "Temp., °C." the first heading on "Recator" should read --Reactor--.

Column 5, Table III, under the last heading "Watts" in the first line after the word "Resistance" remove the ink mark which occurs before the number ".263."

Signed and sealed this 17th day of September 1974.

(SEAL)
Attest:

McCOY M. GIBSON JR.          C. MARSHALL DANN
Attesting Officer          Commissioner of Patents